US006407025B1

(12) United States Patent
Brandt et al.

(10) Patent No.: US 6,407,025 B1
(45) Date of Patent: Jun. 18, 2002

(54) METHOD OF MANUFACTURE OF MULTICATIONIC MOLECULAR SIEVES

(75) Inventors: Alfons Brandt, Salzmünde; Baldur Unger, Dessau; Hartmut Tschritter, Gera, all of (DE); Martin Bülow, Basking Ridge, NJ (US); Frank R. Fitch, Bedminster, NJ (US); Adeola F. Ojo, Scotch Plains, NJ (US)

(73) Assignees: The BOC Group, Inc., Murray Hill, NJ (US); Chemiewerk Bad Köstritz GmbH, Bad Köstritz (DE)

( * ) Notice: Subject to any disclaimer, the term of this patent is extended or adjusted under 35 U.S.C. 154(b) by 0 days.

(21) Appl. No.: 09/501,905

(22) Filed: Feb. 10, 2000

(51) Int. Cl.⁷ .......................... B01J 29/08; B01J 29/18; B01J 29/60

(52) U.S. Cl. ............................. 502/65; 502/64; 502/73; 502/78; 502/79; 502/86

(58) Field of Search ............................. 502/60, 64, 65, 502/73, 78, 79, 86

(56) References Cited

U.S. PATENT DOCUMENTS

| 2,882,243 A | 4/1959 | Milton |
| 2,882,244 A | 4/1959 | Milton |
| 3,216,789 A | 11/1965 | Breck et al. |
| 4,859,217 A | 8/1989 | Chao |
| 4,925,460 A | 5/1990 | Coe et al. |
| 5,152,813 A | 10/1992 | Coe et al. |
| 5,174,979 A | 12/1992 | Chao et al. |
| 5,258,058 A | 11/1993 | Coe et al. |
| 5,413,625 A | 5/1995 | Chao et al. |
| 5,417,957 A | 5/1995 | Coe et al. |
| 5,419,891 A | 5/1995 | Coe et al. |
| 5,464,467 A | 11/1995 | Fitch et al. |
| 5,616,170 A | 4/1997 | Ojo et al. |
| 5,833,844 A | * 11/1998 | Leavitt |
| 5,868,818 A | * 2/1999 | Ogawa et al. |
| 5,916,836 A | 6/1999 | Toufar et al. |
| 5,932,509 A | 8/1999 | Balse et al. |

FOREIGN PATENT DOCUMENTS

| EP | 0 685 429 A2 | 12/1995 |
| EP | 0 685 430 A2 | 12/1995 |
| EP | 0 729 782 A2 | 9/1996 |
| GB | 1 580 928 | 12/1980 |

OTHER PUBLICATIONS

R.P. Townsend, "Ion Exchange in Zeolites," Introduction to Zeolite Science and Practice: Studies in Surface Science and Catalysis, 1991, vol. 58, pp. 359–390.

D.W. Breck, W.G. Eversole, R.M. Milton, T.B. Reed and T.L. Thomas, "Physical and Inorganic Chemistry: Crystalline Zeolites. I. The Properties of a New Synthetic Zeolite, Type A," Journal of the American Chemical Society, Dec. 8, 1956, vol. 78, No. 23, pp. 5963–5977.

L.B. Sand, "Synthesis of Large–Port and Small–Port Mordenites," Molecular Sieves, Society of Chemical Industry, 1968, pp. 71–76.

* cited by examiner

*Primary Examiner*—Steven P. Griffin
*Assistant Examiner*—Christina Ildebrando
(74) *Attorney, Agent, or Firm*—Philip H. Von Neida; Salvatore P. Pace

(57) ABSTRACT

Zeolites exchanged with lithium cations and polyvalent cations are prepared by first partially ion-exchanging a sodium-containing zeolite, a potassium-containing zeolite or a sodium- and potassium-containing zeolite with polyvalent cations, then heat-treating the partially polyvalent cation-exchanged zeolite, then ion exchanging the heat-treated zeolite with ammonium cations, and then reacting the ammonium cation-exchanged zeolite with a water-soluble lithium compound under conditions which result in the removal of ammonia from the reaction zone.

23 Claims, No Drawings

METHOD OF MANUFACTURE OF MULTICATIONIC MOLECULAR SIEVES

FIELD OF THE INVENTION

This invention relates to a method of producing mixed cation-containing zeolite molecular sieves, and more particularly to a method in which a parent zeolite molecular sieve is first cation-exchanged with rare earth or other appropriate polyvalent cations, then subjected to an intermediate thermal treatment, then further cation-exchanged with ammonium cations, and then cation-exchanged with lithium and/or other desired cations under conditions appropriate to replace ammonium cations in the zeolite molecular sieve by lithium and/or the other desired cations.

BACKGROUND OF THE INVENTION

Many industrially utilized zeolites are most economically synthesized in their sodium, potassium or mixed sodium-potassium cation forms. For example zeolites A, (U.S. Pat. No. 2,882,243), X (U.S. Pat. No. 2,882,244) and mordenite (L. Sand: "Molecular Sieves", Society of Chemistry and Industry, London (1968), pages 71–76), are usually synthesized in their sodium forms, whereas zeolites LSX, i. e., zeolite X in which the atomic ratio of framework silicon-to-aluminum is approximately 1, (UK 1,580,928) and zeolite L (U.S. Pat. No. 3,216,789) are usually synthesized in their mixed sodium and potassium forms. Zeolite L may also be readily synthesized in its pure potassium form.

Although these zeolites have useful properties as synthesized, it is often preferred to ion-exchange them to further enhance their adsorption and/or catalytic properties. This topic is discussed at length in chapter 8 of the comprehensive treatise of Breck (D. W. Breck: "Zeolite Molecular Sieves", Pub. Wiley, N.Y., 1973). Conventional ion exchange of zeolites is carried out by contacting the zeolite, in either powdered or agglomerated form, using batch-wise or continuous processes, with aqueous solutions of salts of the cations to be introduced. These procedures are described in detail in Chapter 7 of Breck and have been reviewed more recently by Townsend (R. P. Townsend: "Ion Exchange in Zeolites", in Studies in Surface Science and Catalysis, Elsevier (Amsterdam) (1991), Vol. 58, "Introduction to Zeolite Science and Practice", pages 359–390).

Conventional exchange procedures may be economically used to prepare many single and/or mixed cation-exchanged zeolites. However, in the cases of lithium, rubidium and/or cesium cation exchange of sodium, potassium, or sodium-potassium zeolites, the original cations are strongly preferred by the zeolite; accordingly, large excesses of expensive salts of the lithium, rubidium and/or cesium cations are needed to effect moderate or high levels of exchange of the original cations. Thus, these particular ion-exchanged forms are considerably more expensive to manufacture than typical adsorbent grades of zeolites. Furthermore, to minimize the cost of the final form of the zeolite, and to prevent discharge of these excess cations to the environment, considerable effort must be made to recover the excess cations from the residual exchange solutions and from washings in which the excess cations remain mixed with the original cations that were exchanged out of the zeolite. Since lithium-containing zeolites have great practical utility as high performance adsorbents for use in the noncryogenic production of oxygen, and rubidium and cesium exchanged zeolites have useful properties for the adsorptive separation of the isomers of aromatic compounds and as catalysts, this problem is of significant commercial interest.

U.S. Pat. No. 4,859,217 discloses that zeolite X (preferably having a framework silicon-to-aluminum atomic ratio of 1 to 1.25), in which more than 88% of the original sodium cations have been replaced by lithium cations, has very good properties for the adsorptive separation of nitrogen from oxygen. In the preparation of the zeolite, the base sodium or sodium-potassium form of the X zeolite was exchanged by conventional ion-exchange procedures, using 4 to 12 fold stoichiometric excesses of lithium salts.

Additionally, a wide range of other lithium-containing zeolites allegedly exhibit advantageous nitrogen adsorption properties. For example, U.S. Pat. Nos. 5,179,979, 5,413, 625 and 5,152,813 describe binary lithium- and alkaline earth-exchanged X zeolites; U.S. Pat. Nos. 5,258,058, 5,417, 957 and 5,419,891 describe binary lithium- and other divalent ion-exchanged forms of X zeolite; U.S. Pat. No. 5,464, 467 describes binary lithium- and trivalent ion-exchanged forms of zeolite X; EPA 0685429 and EPA 0685430 describe lithium-containing zeolite EMT; and U.S. Pat. No. 4,925, 460 describes lithium-containing chabazite. In each case conventional ion-exchange procedures are contemplated, involving significant excesses of lithium cations over the stoichiometric quantity required to replace the original sodium and/or potassium cations in the zeolite. In the case of the binary lithium-exchanged zeolites, it may sometimes be possible to slightly reduce the quantity of lithium salt used by carrying out the exchange with the second cation before the lithium ion-exchange step (U.S. Pat. No. 5,464, 467) or by carrying out both exchanges simultaneously (EPA 0729782), but in either case a large excess of lithium cations is still needed to achieve the desired degree of exchange of the remaining sodium and potassium cations.

U.S. Pat. No. 5,916,836, issued to Toufar et al., discloses a method of preparing lithium-exchanged or polyvalent cation and lithium cation-exchanged molecular sieves from molecular sieves that originally contain sodium cations, potassium cations or both sodium and potassium cations without requiring the use of a large excess of lithium cations. The method of Toufar et al. includes the step of exchanging the original zeolite with a source of ammonium cations prior to the lithium cation exchange. The initial molecular sieve may contain polyvalent cations in addition to sodium and/or potassium cations, or polyvalent cations may be introduced at any stage of the process.

The advantages of the ammonium intermediate exchange concept of Toufar et al. over the "classical" direct exchange method are abundant, particularly when one desires to prepare the pure lithium form of the zeolite as the product. However, the pure lithium form of these zeolites is not always the desired form for a particular application, for example, nitrogen adsorption processes, due to its relatively low thermal stability. Furthermore, because of their high lithium content, pure lithium-exchanged zeolites are considerably more costly to prepare than lithium-based mixed-cation containing zeolites. When one wishes to prepare a mixed cationic form containing, for example, lithium cations and polyvalent cations, particularly those of rare earth metals, the Toufar et al. process leaves something to be desired. In order to effect the complete release of ammonia during the lithium ion exchange, the Toufar et al. process requires the use of a high pH during this step. Unfortunately, polyvalent cations undergo a more or less extensive hydrolysis in media with high pH values, and this behavior may cause not only a higher-than-stoichiometric uptake of lithium, but also a decrease in thermal/hydrothermal stability, because of the intermediate formation of relatively unstable acidic sites within the zeolite structure.

This invention presents an efficient method of preparing a zeolite containing, as exchange cations, polyvalent cations and one or more of lithium, rubidium and cesium cations, by a method which provides more precise control of the amount of both the polyvalent cations and the lithium, rubidium and/or cesium cations introduced into the zeolite, and stabilization of the polyvalent ions within the zeolite structure.

SUMMARY OF THE INVENTION

According to a broad embodiment, the invention comprises a method of producing an ion-exchanged zeolite comprising the steps:

(a) contacting at least one synthetic zeolite selected from the group consisting of structure types FAU, EMT, LTA, CHA, MOR and combinations thereof and containing sodium cations, potassium cations or mixtures thereof with a source of polyvalent cations, thereby replacing some of the sodium cations, potassium cations or mixtures thereof with polyvalent cations and producing a partially polyvalent cation-exchanged zeolite, (b) heat treating the partially polyvalent cation-exchanged zeolite at a temperature in the range of about 30 to about 190° C., (c) contacting the heat-treated zeolite with a source of ammonium cations, thereby replacing at least part of the sodium cations, potassium cations or mixtures thereof remaining on the zeolite with ammonium cations, and producing polyvalent cation and ammonium cation ion-exchanged zeolite, and (d) contacting the polyvalent cation and ammonium cation ion-exchanged zeolite with a source of Group 1A cations other than sodium and potassium cations in a reaction zone under conditions which effect the replacement of ammonium cations with at least one of the Group 1A cations other than sodium and potassium cations and the removal of at least one reaction product from the reaction zone.

In a preferred embodiment of the invention, the at least one synthetic zeolite contains sodium cations. In this preferred embodiment, the at least one synthetic zeolite preferably comprises type A zeolite, type X zeolite, type EMC-2 zeolite, mixtures of two or more of type A zeolite, type X zeolite, or type EMC-2 zeolite or intergrowths of two or more of type A zeolite, type X zeolite, or type EMC-2 zeolite. In a more preferred embodiment, the at least one synthetic zeolite comprises type X zeolite. In a still more preferred embodiment, the type X zeolite has a framework silicon-to-aluminum atomic ratio of 0.9 to 1.1.

In another preferred embodiment of the invention, the polyvalent cations comprise trivalent cations. Preferably, they comprise, as trivalent cations, aluminum, scandium, gallium, iron, chromium, indium, yttrium, single rare earth cations, mixtures of two or more rare earth cations, or mixtures thereof. In a more preferred embodiment, the polyvalent cations comprise at least one rare earth cation, and the overall content of said polyvalent cations comprises about 3 to about 50%, on an equivalents basis, of the exchangeable cations of the zeolite. In this more preferred embodiment, step (b) of the broad embodiment is carried out at a temperature in the range of about 50 to about 150° C., and preferably, the polyvalent cations comprise at least one rare earth cation, and the overall content of the polyvalent cations comprises about 5 to about 20%, on an equivalents basis, of the exchangeable cations of the zeolite.

In another preferred embodiment, the zeolite is type X zeolite, and its X-ray diffraction $\{2\ 2\ 2\}/\{3\ 1\ 1\}$ peak intensity ratio decreases by more than 50% during step (b). In this ratio, the values $\{2\ 2\ 2\}$ and $\{3\ 1\ 1\}$ are the Miller indices of the selected X-ray diffraction lines characteristic of zeolite X.

In another preferred embodiment of the invention, the Group 1A cations other than sodium and potassium cations comprise lithium, rubidium, cesium or mixtures thereof, and more preferably comprise lithium cations. Preferably, the lithium cations are in the form of lithium hydroxide or a precursor thereof, and preferably, the reaction zone is an aqueous medium. The lithium cation exchange step, step (d), is preferably carried out at a temperature in the range of about 0 to about 100° C., and more preferably, it is carried out at a pH value greater than about 10.

In another preferred embodiment, step (d) of the broad embodiment is carried out at an absolute pressure not greater than about one bar, and in another preferred embodiment, the reaction zone is flushed with a purge gas during step (d).

In another preferred embodiment, the polyvalent cation and ammonium cation ion-exchanged zeolite is produced by contacting the heat-treated zeolite with a water-soluble ammonium salt. Preferably, the water-soluble ammonium salt is ammonium sulfate, ammonium chloride, ammonium nitrate, ammonium acetate or mixtures of these.

DETAILED DESCRIPTION OF THE INVENTION

The ion-exchange material treated in accordance with the method of the invention can be any zeolite, but preferably it is a synthetic zeolite of the FAU, EMT, LTA, CHA, or MOR structure types, or a combination of two or more of these. The process of the invention is especially suitable for the ion-exchange of type A zeolite, type X zeolite, type EMC-2 zeolite or combinations of two or more of these, for example in the form of mixtures or intergrowths. The zeolite being treated generally has sodium and/or potassium cations as exchangeable cations, the particular exchangeable cations initially in the zeolite usually depending upon the zeolite being treated and the method of its synthesis. For example, low silicon type X zeolite (LSX) as synthesized generally contains both sodium and potassium cations, since LSX is most easily synthesized in this form.

The method of the invention is multistep and includes a first ion exchange step in which polyvalent cations are substituted for some of the sodium and/or potassium cations initially in the zeolite, a heat treatment step, a second ion exchange step, in which ammonium cations are substituted for most or all of the unexchanged sodium and/or potassium cations remaining in the zeolite, and a third ion exchange step, in which lithium cations, rubidium cations, cesium cations or mixtures of these are substituted for ammonium cations in the zeolite.

The first ion exchange step, i. e., the polyvalent cation exchange step, is generally carried out before any other cation exchange step of the process. The polyvalent cations exchanged in this step may be divalent cations, trivalent cations or combinations thereof. Suitable divalent cations include ions of the elements of Group IIA of the Periodic Table, such as magnesium, calcium, strontium and barium, as well as divalent cation forms of elements with multiple valency, such as iron (II), cobalt (II), manganese (II), chromium (II), zinc, cadmium, tin (II), lead (II), nickel, etc. Trivalent cations which may be present on the ion-exchange material include aluminum, scandium, gallium, yttrium, iron (III), i.e., ferric ion, chromium (III), i.e., chromic ion, indium and cations of the lanthanide series, i.e., the rare earth elements. The lanthanide series ions include lanthanum, cerium, praseodymium, neodymium, promethium, samarium, europium, gadolinium, terbium, dysprosium, holmium, erbium, thulium, ytterbium, and lutetium cations. Mixtures of any two or more of the above polyvalent cations can also be used in this step. Preferred polyvalent cations are the trivalent cations, and the preferred trivalent cations include aluminum, cerium, lanthanum and rare earth cation mixtures, particularly rare earth mixtures in which the combined concentrations of lanthanum, cerium, praseodymium and neodymium totals at least about 40%, and preferably at least about 75% of the total number of rare earth cations in the mixtures.

The quantity of polyvalent cations exchanged into the zeolite is not critical to the process; however, it is generally preferred that at least 3%, on an equivalents basis, based on the total exchangeable cations in the zeolite, be exchanged into the zeolite. On the upper end, it is preferred that the percentage of polyvalent cations exchanged into the zeolite not exceed about 50%, on an equivalents basis. In a more preferred embodiment of the invention, the total amount of polyvalent cations exchanged into the zeolite is in the range of about 5 to about 20%, on an equivalents basis, based on the total exchangeable cations in the zeolite. Since polyvalent cations introduced into the zeolite in this step of the method are not substantially replaced by ammonium cations in the subsequent ammonium ion-exchange step or by the lithium, rubidium and/or cesium cations in the final ion-exchange step, the polyvalent ion-exchange step is designed to introduce into the zeolite the amount of polyvalent cations that it is desired to have in the final product.

The polyvalent cation exchange can be carried out by any of the well-known zeolite cation exchange techniques, the particular procedure followed not being critical to the method of the invention. According to one particularly suitable procedure, the initial zeolite in powder form is suspended in an aqueous liquid, e.g., water, and aqueous solution of the desired polyvalent cation salt or salts, e.g., a rare earth chloride mixture, is added thereto while maintaining the mixture in suspension at a temperature in the range of about 0 to about 80° C., for example, at ambient temperature, until the desired degree of cation exchange is achieved, which usually occurs in about 1 to about 10 hours. The suspension is then separated by filtration, and the filter cake is washed with distilled water, thereby producing the desired partially polyvalent cation-exchanged intermediate product.

The second step of the method of the invention comprises a heat treatment of the partially polyvalent cation-exchanged zeolite. The duration of the heat treatment step is not critical, however, it is carried out for a period of time sufficient to produce the desired result. In general, the heat treatment is preferably carried out for a period of at least 30 minutes, and the desired result is generally achieved in about 1 to about 6 hours. In carrying out the heat treatment step the polyvalent cation-exchanged zeolite is heated to and maintained at a temperature generally in the range of about 30 to about 190° C., and, preferably, in the range of about 50 to about 150° C. During the heat treatment step the partially polyvalent cation-exchanged zeolite, in certain cases, undergoes an alteration that can be monitored by a change of its X-ray diffraction (XRD) pattern. In the case of type X zeolite, the alteration of the zeolite during heat treatment is accompanied by a decrease of the ratio of the intensities of the XRD peaks {2 2 2} and {3 1 1} to less than about 50% of its original value, i. e., its value prior to the heat treatment step. Preferably this ratio is decreased to less than about 30% of its original value. In the ratio, the values {2 2 2} and {3 1 1} are the Miller indices of the selected X-ray diffraction lines characteristic of zeolite X.

The third step of the process, i. e., the second ion-exchange step, is an ammonium exchange step, which can be carried out by any suitable procedure. In preferred embodiments, this step is carried out by contacting the heat-treated zeolite with the ammonium cations in salt form. It is particularly preferred to conduct the ammonium ion-exchange step using a water-soluble ammonium salt. Preferred water-soluble ammonium salts include ammonium sulfate, ammonium chloride, ammonium nitrate, ammonium acetate or mixtures of these. According to this preferred procedure, the heat-treated zeolite in powdered form is suspended in an aqueous liquid in a stirred vessel at ambient temperature or at temperatures higher than ambient temperature. Upon completion of the ammonium exchange, the zeolite is desirably washed one or more times with deionized water.

Since substantially all of the ammonium cations in the ion-exchanged zeolite will be replaced by the desired lithium cations, rubidium cations, cesium cations or mixture thereof, in the final ion-exchange step of the process, it is preferred that substantially all of the residual sodium and/or potassium cations in the zeolite be replaced by ammonium cations. To accomplish this, it is often preferred to use a multi-stage process for the ammonium ion exchange. This result can also be readily achieved by applying a continuous countercurrent procedure, using, for example, a belt filter.

In the final step of the invention, the third required ion-exchange step, the ammonium form or substituted ammonium form of the ion-exchange material is contacted with a compound of the desired cation. As stated above, the desired cations introduced into the zeolite in the final step are lithium cations, rubidium cations, cesium cations or mixtures of these, and most preferably they are lithium cations. This exchange is preferably carried out under conditions such that ammonia, or a volatile ammonium-containing compound, is driven from the reaction zone. Preferably, this step is done in an aqueous environment where the source of the cation is its hydroxide or a precursor thereof, e.g., the oxide or the pure metal, if it reacts with water to form the hydroxide, or any salt of the cation whose aqueous solution has a pH value higher than about 10. The reaction can be carried out at any temperature at which the system remains in the liquid state, however, the rate of the reaction is increased substantially if elevated temperatures, preferably temperatures of 50° C. or higher, are applied. The generated volatile ammonia or ammonium compound may be removed from the ion-exchange slurry by blowing air or other suitable gases through the slurry at temperatures higher than ambient temperature, or by applying vacuum. The amount of lithium, rubidium and/or cesium cations necessary for the final ion-exchange step is usually at, or slightly above, the stoichiometric amount needed for total replacement of ammonium cations and total conversion of ammonium cations into ammonia or other volatile ammonium products. The lithium, rubidium and/or cesium ion-exchange step can be carried out in any of various ways, for example, it can be carried out in a stirred vessel, with a lithium, rubidium and/or cesium hydroxide-containing source being added continuously or in one or more slugs, or it can be carried out by passing a lithium, rubidium and/or cesium hydroxide-containing solution over the agglomerated form of the ammonium ion-exchanged zeolite in a column.

The method is especially suitable for producing ion-exchange materials containing a very well defined mixture of polyvalent cations together with lithium, rubidium and/or cesium cations that are difficult to exchange by traditional modes. In such a case, the polyvalent cation and ammonium cation ion-exchanged material is contacted with a stoichiometric mixture of the compounds of the desired cations, with any excess required coming from the cation exhibiting the lowest selectivity towards the ion-exchange material.

The final ion-exchanged product may be in the powdered form or it may be agglomerated and shaped into particles, e.g., extruded pellets. In general, it is preferred to conduct agglomeration before the ammonium ion-exchange step or after the lithium, rubidium and/or cesium ion-exchange step. Any crystalline or amorphous binder or combination of binders suitable for use with the ion-exchange material can be used as an agglomerant, and any method of agglomeration can be employed. Typical binders and methods of agglomeration are disclosed in U.S. Pat. Nos. 5,464,467, 5,616,170 and 5,932,509 the disclosures of which are incorporated herein by reference.

The polyvalent cation containing material made according to state of the art procedures (e. g., U.S. Pat. No. 5,916,836) may exhibit a "cation excess" if the usual cation charges (e.g., +2 for Ca, or +3 for La cations) are assumed. This amount of "excess cations" is probably due to hydrolysis of polyvalent cations, which is known to take place under strongly alkaline conditions. Surprisingly, the thermal treatment step of this invention appears to suppress this hydrolysis, possibly by at least partially dehydrating the polyvalent cations and irreversibly transferring the polyvalent cations to stable positions within the zeolite structure.

The invention is illustrated in the following detailed examples.

EXAMPLE 1 (Comparative)

In this example a conventional as-synthesized LSX zeolite sample (referred to as Na,K-LSX) in powder form and having the molar composition, 0.77 $Na_2O$:0.23 $K_2O:AL_2O_3:2SiO_2$, was used.

The crystalline material in powdered form was suspended in water and an aqueous solution of a technical grade rare earth chloride mixture containing lanthanum, praseodymium, cerium, neodymium and traces of other rare earth elements was added in an amount calculated to result in a degree of cation exchange of about 13 equivalents % of the initial cation concentration on the zeolite, the suspension being continuously stirred at ambient temperature during the addition. After 5 hours of stirring at 40° C., the suspension was separated by filtration, and the filter cake was washed with distilled water, thereby producing a sodium, potassium, rare earth LSX zeolite (Na,K,RE-LSX).

The Na,K,RE-LSX filter cake was suspended in water and an excess of an aqueous ammonium sulphate solution (about 20 wt %) was added under stirring at 60° C. to remove the sodium and potassium cations. After 3 hours of stirring, the suspension was separated by filtration, and the filter cake washed with water. This operation was repeated three times to get to a residual $Na_2O$ content below 0.3 wt. % and to a residual $K_2O$ content below 0.1 wt. % (anhydrous basis). Thus, an ammonium-rare earth LSX zeolite was prepared without intermediate potassium cation exchange.

The resulting ammonium rare earth zeolite was then suspended in water and solid technical grade lithium hydroxide monohydrate was added under stirring until the pH value of the resulting suspension remained slightly above 12.5. After 1 hour, the suspension was heated to 60° C., and the pH value of the suspension was again established at a value of about 12–12.5, by adding the necessary amount of lithium hydroxide. After 6 hours of stirring at 60° C., the release of ammonia from the suspension was nearly complete; the suspension was filtered off, and the filter cake was washed with water and then carefully dried, starting at a temperature of about 40° C.

The analysis of the dried powder gave a molar composition, 0.86 $Li_2O$:0.043 $RE_2O_3$:0.025 $Na_2O$:0.01 $K_2O:Al_2O_3$:2 $SiO_2$, resulting, thus, in a molar cation-to-aluminum ratio of 1.025: 1, presupposing that the rare earth cations were trivalent. The result that the cation-to-aluminum ratio exceeds the value 1.00 could be explained by hydrolysis of trivalent rare earth cations which takes place in alkaline solutions. Thus, it appears that complex cations, e.g., $RE(OH)^{2+}$ and/or $RE(OH)_2^+$, which, formally, have a lower positive charge, may be formed.

As a result of the rare earth cation exchange, a dramatic change in the peak intensities of the XRD patterns took place in such a way, that the intensities of practically all peaks but two decrease over the range from 5° to 35° (2 theta, $CuK_\alpha$ radiation). The intensities for the X-ray diffraction peaks with Miller indices {2 2 2} and {4 0 0} increased. Therefore, and for practical purposes, the {2 2 2}-to-{3 1 1} intensity ratio (referred to as "|222/|311 ratio") was used as a means to monitor changes occurring during the rare earth cation-exchange step.

The as-synthesized Na,K-LSX sample exhibited a |222/|311 ratio lower than 0.05, while the Na,K,RE-LSX sample with 13 equivalents % rare earth cations exhibited a |222/|311 ratio of 0.4.

EXAMPLE 2

In this example, the starting material was a Na,K,RE-LSX filter cake prepared in the manner described in Example 1. This material was dried stepwise on a moisture analyzer, type MA30 (made by Sartorius AG, Germany).

An approximately 25 g sample of the Na,K,RE-LSX filter cake dried at air at ambient temperature was placed on the aluminum plate of the equipment and heated at 60° C. for 60 minutes. Then the temperature was elevated in steps of 10 K, the material being heated for 60 minutes at each given temperature, until the final temperature of heat treatment, 130° C., was reached. Approximately 19 g of thermally pretreated Na,K,RE-LSX material was produced.

The rare earth cation exchange and the thermal treatment of the Na,K,RE-LSX was followed by X-ray diffraction measurements, as described in Example 1. The as-synthesized Na,K-LSX sample exhibited a |222/|311 ratio lower than 0.05, while the Na,K,RE-LSX zeolite with 13 equivalents % rare earth exhibited a |222/|311 ratio of 0.4. After the heat-treatment step, the |222/|311 ratio was reduced to a value of about 0.1.

This material was then cation-exchanged as described in Example 1 to produce first an ammonium rare earth LSX zeolite and then a lithium-rare earth LSX zeolite.

The analysis of the dried powder gave a molar composition, 0.84 $Li_2O$:0.043 $RE_2O_3$:0.02 $Na_2O$:0.01 $K_2O:Al_2O_3$:2 $SiO_2$, resulting, thus, in a molar cation-to-aluminum ratio of 1.00: 1 (presupposing that the rare earth cations were trivalent). The residual ammonium cation content of this material was clearly below a value of 0.5 equivalents %. Thus, in contrast to the case for the Li,RE-LSX zeolite prepared in Example 1, the apparent formation of "excess cations" was not observed.

Although the invention has been described with particular reference to specific examples, these are merely exemplary of the invention and variations are contemplated. The scope of the invention is limited only by the breadth of the appended claims.

What is claimed is:

1. A method of producing an ion-exchanged material comprising the steps:
   (a) contacting at least one synthetic zeolite selected from the group consisting of structure types FAU, EMT, LTA, CHA, MOR, and combinations thereof and containing sodium cations, potassium cations or mixtures thereof with a source of polyvalent cations, thereby replacing some of said sodium cations, potassium cations or mixtures thereof with polyvalent cations and producing a partially polyvalent cation-exchanged zeolite,
   (b) drying said partially polyvalent cation-exchanged eolite and subsequently heat treating said dried, partially polyvalent cation exchanged zeolite by elevating the temperature stepwise to a temperature in the range of about 30 to about 190° C.,
   (c) contacting the heat-treated zeolite with a source of ammonium cations, thereby replacing at least part of the cations, potassium cations or mixtures thereof remaining on said zeolite with ammonium cations, and producing polyvalent cation and ammonium cation ion-exchanged zeolite, and
   (d) contacting said polyvalent cation and ammonium cation ion-exchanged zeolite with a source of Group 1A cations other than sodium and potassium cations in a reaction zone under conditions which effect the replacement with ammonium cations with at least one of said Group 1A cations other than sodium and potassium cations and the removal of at least one reaction product from said reaction zone.

2. The method of claim 1, wherein said at least one synthetic zeolite contains sodium cations.

3. The method of claim 2, wherein said at least one synthetic zeolite comprises type A zeolite, type X zeolite, type EMC-2 zeolite, mixtures of two or more of type A zeolite, type X zeolite, or type EMC-2 zeolite or intergrowths of two or more of type A zeolite, type X zeolite, or type EMC-2 zeolite.

4. The method of claim 3, wherein said at least one synthetic zeolite comprises type X zeolite.

5. The method of claim 4, wherein said type X zeolite has a framework silicon-to-aluminum atomic ratio of about 0.9 to about 1.1.

6. The method of any one of claims 1, 2, 4 or 5 wherein said polyvalent cations comprise trivalent cations.

7. The method of any one of claims 1, 2, 4 or 5, wherein said polyvalent cations comprise aluminum, scandium, gallium, iron, chromium, indium, yttrium, single rare earth cations, mixtures of two or more rare earth cations, or mixtures thereof.

8. The method of claim 7, wherein said polyvalent cations comprise at least one rare earth cation, and the overall content of said polyvalent cations comprises about 3 to about 50%, on an equivalents basis, of the exchangeable cations on said zeolite.

9. The method of claim 8, wherein step (b) is carried out at a temperature in the range of about 50 to about 150° C.

10. The method of claim 9, wherein said polyvalent cations comprise at least one rare earth cation, and the overall content of said polyvalent cations comprises about 5 to about 20%, on an equivalents basis, of the exchangeable cations on said zeolite.

11. The process of claim 10, wherein said zeolite is type X zeolite and it exhibits an X-ray diffraction peak intensity ratio {2 2 2}/{3 1 1} which decreases by more than 50% during step (b).

12. The method of any one of claims 1, 2, 4 or 5, wherein said Group 1A cations other than sodium and potassium cations comprise lithium cations, rubidium cations, cesium cations or mixtures thereof.

13. The method of claim 12, wherein said Group 1A ions other than sodium and potassium cations comprise lithium cations.

14. The method of claim 13, wherein said lithium cations are supplied in the form of lithium hydroxide or a precursor thereof.

15. The method of claim 14, wherein said reaction zone is an aqueous medium.

16. The method of claim 15 wherein step (d) is carried out at a temperature in the range of about 0 to about 100° C.

17. The method of claim 16, wherein step (d) is carried out at a pH value greater than about 10.

18. The method of claim 14, wherein step (d) is carried out at an absolute pressure not greater than about one bar.

19. The method of claim 17, wherein step (d) is carried out at an absolute pressure not greater than about one bar.

20. The method of claim 14, wherein said reaction zone is flushed with a purge gas during said contacting in step (d).

21. The method of claim 17, wherein said reaction zone is flushed with a purge gas during said contacting in step (d).

22. The method of claim 1, wherein said polyvalent cation and ammonium cation ion-exchanged zeolite is produced by contacting the heat-treated zeolite with a water-soluble ammonium salt.

23. The method of claim 22, wherein said water-soluble ammonium salt is ammonium sulfate, ammonium chloride, ammonium nitrate, ammonium acetate or mixtures of these.

* * * * *